No. 698,894. Patented Apr. 29, 1902.
P. H. BAYLEY.
SOLDERING IRON HEATER.
(Application filed Sept. 11, 1901.)
(No Model.)
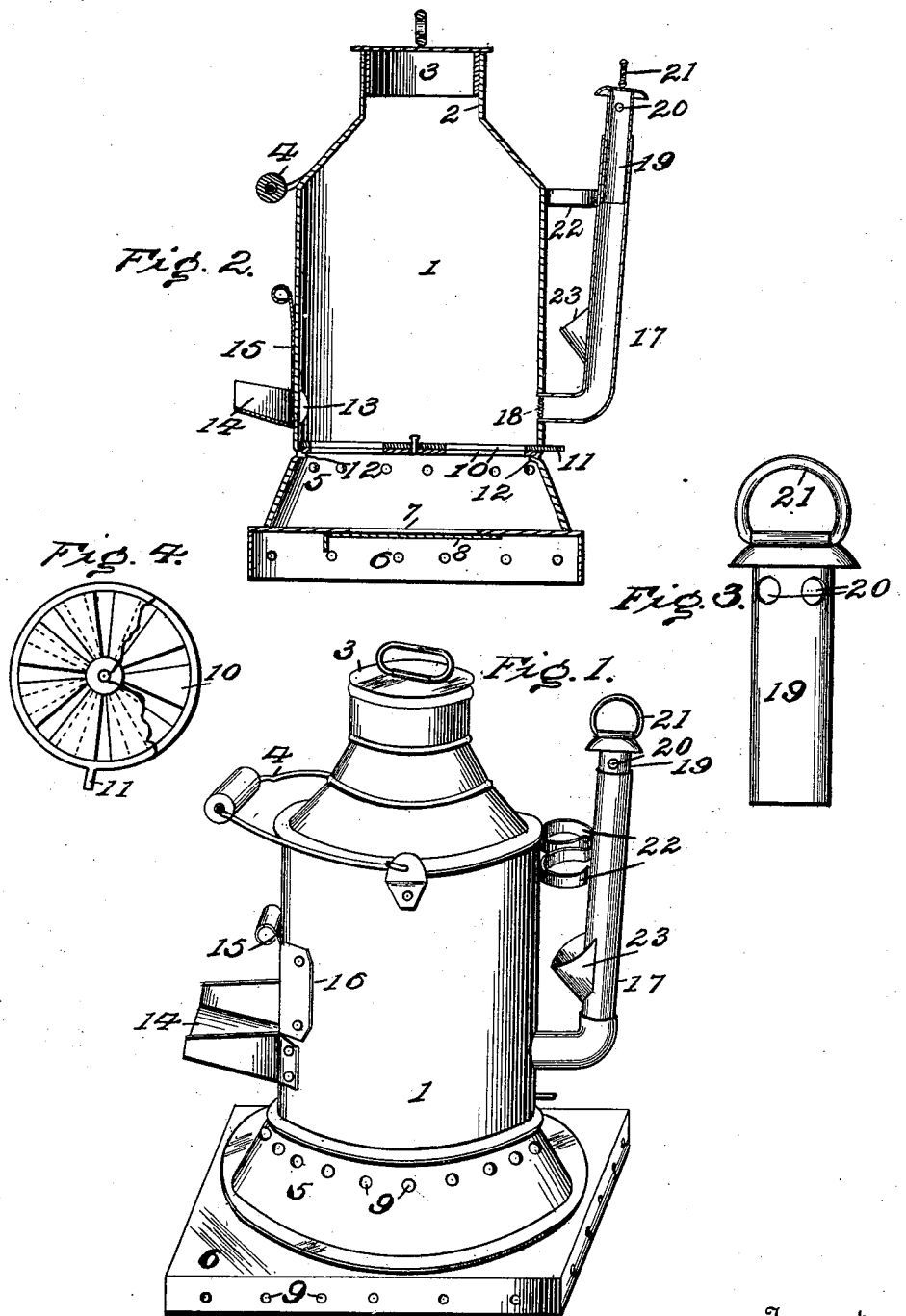
Witnesses
Harry L Gould
Jno. R. Williams.
Inventor
Perry H. Bayley
By David W. Gould.
Attorney

UNITED STATES PATENT OFFICE.

PERRY HENRY BAYLEY, OF SIDNEY, OHIO.

SOLDERING-IRON HEATER.

SPECIFICATION forming part of Letters Patent No. 698,894, dated April 29, 1902.

Application filed September 11, 1901. Serial No. 75,011. (No model.)

*To all whom it may concern:*

Be it known that I, PERRY HENRY BAYLEY, a citizen of the United States, residing at Sidney, in the county of Shelby and State of Ohio, have invented certain new and useful Improvements in Soldering-Iron Heaters, of which the following is a specification.

My invention relates to an improvement in soldering-iron heaters; and it has for its object the production of a heater especially designed for the economic use of fuel and of simple and inexpensive construction.

The invention consists in certain details of construction and arrangement of parts, which will first be described in connection with the accompanying drawings and then pointed out in the claims.

Figure 1 of the drawings is a perspective view of my improved heater. Fig. 2 is a vertical sectional view of the same. Fig. 3 is an enlarged elevation of the draft-regulator. Fig. 4 is a broken plan of the grate.

Referring to the drawings, 1 represents the casing of the heater, designed to contain the fuel, comprising a cylindrical sheet-metal body narrowed at its upper portion and formed with a fuel-receiving opening 2, having a close-fitting cover 3. The casing is provided with the usual bail 4 and has a flaring bottom 5, which is supported upon a hollow base 6. The top of the base, centrally beneath the casing, is formed with an opening 7, having a sliding cover 8. The flaring bottom 4 of the casing and also the vertical walls of the base 6 are preferably perforated at 9 to afford suitable draft.

10 represents the grate, comprising two slotted disks, as shown, the upper one of which is centrally pivoted upon the lower and is provided with a handle 11, which projects through a suitable opening in casing 1 to afford means for shaking the grate. The grate rests upon offsets 12, formed in the casing immediately above the flaring portion 5.

A short distance above the grate openings 13 are formed in the casing to admit the tools to be heated, a shelf 14 projecting from the casing below these openings to aid in supporting the tools. A cover 15, sliding between the casing and overlying flanges 16, secured to the casing, is adapted to cover the openings 13 when not in use.

The gist of my improvement resides in the back draft, the opening of which into the casing is in direct horizontal alinement with the two receiving-openings 13. This back draft comprises a pipe 17, the opening of which into the casing is preferably covered with wire screen 18 to prevent the coals choking the draft. The upper end of pipe 17, which rises to about the top of the casing, is provided with a draft-regulator 19, comprising a short length of pipe closed at the upper end and telescoping in the upper end of the draft-pipe, the regulator being provided near its upper end with a horizontal row of perforations 20 and conveniently manipulated by a ring-handle 21.

In the rear of the casing, between it and the draft-pipe, are arranged the tool-holders designed to retain the tools when not in use. The holders comprise a double-ring member 22, secured to both the casing and the draft-pipe, and a socket 23, secured to the draft-pipe below the ring member. The tools are passed down through the ring member with their pointed ends resting in the socket. By the described arrangement and construction of the tool-holders I am enabled to utilize the ring member as a support for the upper end of the draft-pipe, and, furthermore, the tools when in place in the holder are held in a readily-accessible position where they are out of contact with the heated casing, and therefore more quickly cooled, and where they do not interfere with the convenient handling of the heater in charging or carrying.

By arranging the opening of the back draft into the casing in horizontal alinement with the tool-receiving openings 13 I gain a very material advantage over the operation of any other heater with which I am familiar in that the fire in the casing is prevented from rising above the back draft, and as this back draft is opposite the tool-receiving opening it follows that the hottest part of the fire will be located between said openings and the back draft, or, in other words, just where most needed to heat the tool. As the fire will not rise above the back draft, it is evident that but a small quantity of fuel is necessary, and by means of the shaking-grate I am enabled to keep the fire in the most efficient condition for service. By means of the draft-regulator 19 the draft may be entirely cut off, partially opened by raising the regulator until the holes 20 are opened to the air, or entirely opened by removing the regulator. By entirely closing the back draft and also closing the slide-cover 15 and closing or partially closing the grate-openings I am enabled to maintain the fire a considerable time without renewal.

I am aware that soldering-iron heaters have been heretofore constructed with a back draft leading from the fire-chamber; but I do not know of any such constructions in which the opening of the back draft in the casing is directly opposite the tool-receiving openings, whereby I gain greater efficiency from a smaller quantity of fuel than would be possible under other circumstances.

The space within the flaring bottom 5 of the casing beneath the grate serves as a receptacle for the ashes shaken through the grate, from which receptacle the ashes may be withdrawn through opening 7, as will be evident.

Having thus described my invention, what I claim as new, and desire to secure by Letters Patent, is—

1. In a soldering-iron heater, a casing, tool-receiving openings formed therein, a draft-pipe leading from the casing, the opening of the draft-pipe into the casing being in horizontal alinement with the tool-receiving openings, means carried by the draft-pipe for regulating the draft to the heater, and a tool-holder carried by the heater and comprising a socket supported solely by the draft-pipe and a ring member connected with the draft-pipe and with the casing.

2. In a soldering-iron heater, a casing having tool-receiving openings formed therein, a draft-pipe leading from the casing, and a tool-holder supported by the draft-pipe, said tool-holder comprising a ring member and a socket, said ring member being connected with the draft-pipe and with the casing and securing the upper end of the draft-pipe against displacement.

3. In a soldering-iron heater, a casing having tool-receiving openings formed therein, a draft-pipe leading from the casing, and a tool-holder, said holder comprising a socket supported solely by the draft-pipe and a ring member connected with the draft-pipe and with the casing.

In testimony whereof I affix my signature in presence of two witnesses.

PERRY HENRY BAYLEY.

Witnesses:
FRANK DUNNAVANT,
HENRY YOST.